United States Patent [19]

Versic

[11] Patent Number: 5,069,972

[45] Date of Patent: Dec. 3, 1991

[54] MOLDABLE MICROCAPSULE THAT CONTAINS A HIGH PERCENTAGE OF SOLID CORE MATERIAL, AND METHOD OF MANUFACTURE THEREOF

[76] Inventor: Ronald J. Versic, 1601 Shafor Blvd., Oakwood, Ohio 45419

[21] Appl. No.: 243,410

[22] Filed: Sep. 12, 1988

[51] Int. Cl.$^5$ .................. H01F 1/00; H01F 1/26; B01J 13/02

[52] U.S. Cl. .................. 428/407; 428/402.24; 428/327; 252/62.54; 523/201

[58] Field of Search .................. 428/402.24, 407; 427/213.3, 213.31, 213.34, 213.36; 523/201, 210, 515; 252/62.54

[56] References Cited

U.S. PATENT DOCUMENTS

| | | | |
|---|---|---|---|
| 1,857,201 | 5/1932 | Lathrop | 148/104 |
| 1,948,308 | 2/1934 | Neighbors | 148/104 |
| 1,982,689 | 12/1934 | Polydoroff | 148/104 |
| 2,068,658 | 1/1937 | Cox | 428/570 |
| 2,162,273 | 6/1939 | Schulze | 336/233 |
| 2,531,445 | 11/1950 | Laycock | 148/104 |
| 2,601,212 | 6/1952 | Polydoroff | 336/233 |
| 2,744,040 | 5/1956 | Altamnn | 148/104 |
| 2,783,208 | 2/1957 | Katz | 252/62.5 |
| 2,971,872 | 2/1961 | Dunton et al. | 148/105 |
| 3,255,052 | 6/1966 | Opitz | 148/105 |
| 3,300,332 | 1/1967 | Gorham et al. | 428/402.24 X |
| 3,933,536 | 1/1976 | Doser et al. | 148/105 |
| 3,935,340 | 1/1976 | Yamaguchi et al. | 427/216 |
| 3,945,823 | 3/1976 | Parent et al. | 430/100 |
| 3,947,371 | 3/1976 | Parent et al. | 430/108 |
| 3,969,547 | 7/1976 | Isawa et al. | 427/214 |
| 4,126,567 | 11/1978 | Otera et al. | 252/62.54 |
| 4,133,774 | 1/1979 | Brynko et al. | 427/213.3 X |
| 4,308,155 | 12/1981 | Tada et al. | 252/62.54 |
| 4,309,457 | 1/1982 | Kawasumi et al. | 427/214 |
| 4,309,459 | 1/1982 | Tokuoka | 427/219 |
| 4,462,919 | 7/1984 | Saito et al. | 252/62.54 |
| 4,475,946 | 10/1984 | Matsufuji et al. | 75/0.5 AA |
| 4,497,722 | 2/1985 | Tsuchida et al. | 252/62.54 |
| 4,508,760 | 4/1985 | Olson et al. | 428/402.24 X |
| 4,543,382 | 9/1985 | Tsuchida et al. | 252/62.54 X |
| 4,601,753 | 7/1986 | Soileau et al. | 75/251 |
| 4,619,861 | 10/1986 | Nakayama et al. | 428/220 |
| 4,620,987 | 11/1986 | Yamashita et al. | 427/131 |
| 4,657,784 | 4/1987 | Olson | 427/213 |
| 4,731,191 | 3/1988 | Swihart | 252/62.55 |
| 4,758,288 | 7/1988 | Versic | 427/402 X |
| 4,879,055 | 11/1989 | Sezaki et al. | 252/62.54 |

*Primary Examiner*—Richard D. Lovering
*Assistant Examiner*—John M. Covert
*Attorney, Agent, or Firm*—Donald P. Gillette

[57] ABSTRACT

Microcapsules having a high loading factor of core material are formed as separate, reservoir microcapsules by coating solid core particles first with a thin, conformal layer of parylene and then with a layer of thermoplastic material.

19 Claims, 1 Drawing Sheet

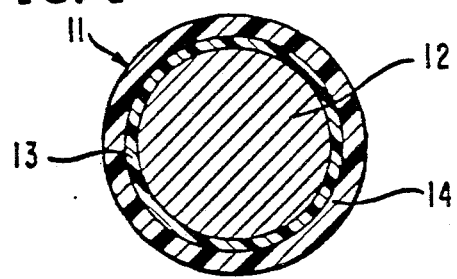
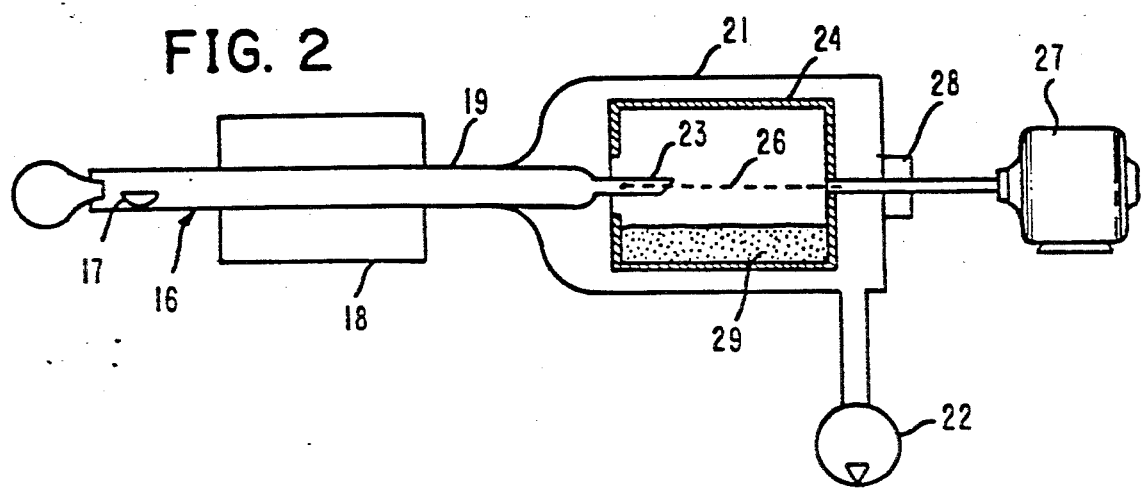
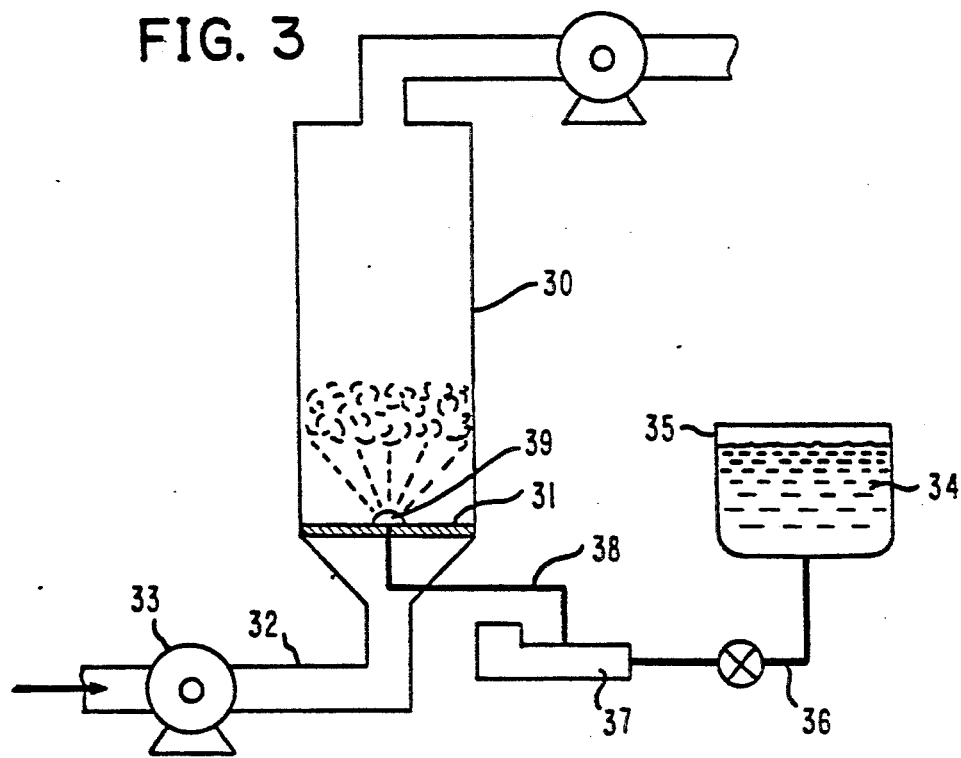

MOLDABLE MICROCAPSULE THAT CONTAINS A HIGH PERCENTAGE OF SOLID CORE MATERIAL, AND METHOD OF MANUFACTURE THEREOF

BACKGROUND OF THE INVENTION

This invention relates to microcapsules, each of which has a core particle of solid material coated by at least a thin, pinhole-free inner layer, which insulates and protects the core particle, and an outer thermoplastic layer that facilitates molding the microcapsules into articles in which the solid core particles, still separate from each other, constitute a high percentage of the mass. The invention also relates to the method of forming such microcapsules. In particular, the invention relates to microcapsules that have solid core particles of magnetic material coated first with a thin, conformal layer of parylene and then with a layer of thermoplastic material.

The microcapsules formed in accordance with this invention are called "reservoir microcapsules" in reference to the fact that each one contains a solid core particle, as distinguished from matrix, or cluster, microcapsules formed by mixing solid core particles with coating material, allowing the latter to solidify in chunks or sheets, and then grinding the chunks or sheets into microcapsule-sized pieces, each of which may contain several—or none—of the original core particles. The matrix encapsulation technique is particularly disadvantageous in the manufacture of articles that require superior magnetic qualities, whether those qualities are associated with material that retains magnetism induced in it, that is, ferromagnetically hard material, such as is used in permanent magnets, or with ferromagnetically soft material that retains little or no magnetism when the inducing field is removed.

The latter type of material is used as core material for coils, and, essentially, its purpose is to concentrate the magnetic flux associated with the flow of current in the coils. For this reason, it is desirable to have ferromagnetically soft material that has a high permeability. When the magnetic flux varies, whether due to variations in current in a coil linked with the core or because of interaction with another magnetic field, eddy currents are produced in the core. These currents cause losses of energy in the core, and such losses increase with the rate of change of the flux producing them and with the lengths of the eddy current paths. They are inversely proportional to the resistivity of the core material. If the device is to operate at its maximum efficiency, the eddy current losses must be minimized, although not to the extent of reducing the permeability of the core too much.

It is a well-known practice, at least for a coil that operates at relatively low frequencies, to make the core out of silicon steel, a material that not only has a high permeability but also has a relatively high resistivity. The core is not made of one large piece of such material but is built up out of laminations, each insulated from all adjacent laminations by a layer of insulation to constrain each eddy current path to one lamination. The eddy current losses are proportional to the cube of the thickness of the laminations and it is, therefore, very important to make the laminations thin, but not so thin that the cumulative thickness of the layers of insulation will be an appreciable fraction of the thickness of the core, displacing too much of the high-permeability ferromagnetic material and reducing its effective permeability.

In the case of a coil to be used at frequencies so high that the eddy current losses in a laminated core would be too great, it is common to make the core of powdered magnetic material mixed or coated with a thermoplastic binder and molded in the proper shape under pressure that may be on the order of 100 tons/in$^2$ or even more. In order to keep the effective permeability of the molded core as high as possible, the magnetic material must constitute as great a percentage of the core as possible. At the same time, it is important to keep the magnetic particles insulated from each other to prevent the formation of eddy current paths that are any longer than the dimensions of a single particle.

Permanent magnets have different criteria, especially those in which rare-earth elements play an important part. While some of them have extremely large $B \times H$ products and would seem to be well suited for use in such things as permanent magnet motors, they are so fragile that even a slight mechanical shock can cause them to turn to fragments.

It is well known that the magnetic characteristics of many magnetic materials deteriorate if the materials are oxidized. The tiny particles that are to be encapsulated in accordance with this invention are particularly susceptible to oxidation, and it is essential to prevent that from happening. It is for that reason, as well as to keep each particle electrically insulated, that the microcapsule shell must be free of pinholes and preferably hydrophobic.

OBJECTS AND SUMMARY OF THE INVENTION

It is an object of this invention to provide a microcapsule that has a high loading factor of solid core material and can be molded with like microcapsules into a solid body at least 75% of which consists of the solid core material.

Another object is to provide a reservoir microcapsule that has a thin, yet strong, protective inner layer of parylene as a primer coating well suited to join to itself a layer of thermoplastic material that molds well with the corresponding layer of thermoplastic material of like microcapsules.

Still another object is to provide a microcapsule that has multiple hydrophobic layers of coatings around a solid core particle, an inner one of which coatings is conformal to the surface of the core particle, is pinhole-free, is built up by molecular deposition, and can be built up to any desired thickness.

A further object is to provide a microcapsule that has a solid core of magnetic material coated by a layer formed by molecular deposition of free radicals of a monomer that polymerize to form a conformal, pinhole-free layer on the surface of the solid core particle, the radicals being non-reactive with the surface.

Still a further object is to provide a microcapsule having multiple, hydrophobic coating layers encapsulating a solid inner particle, the inner layer being a pinhole-free, electrically insulating layer conformal to the surface of the particle and having a higher melting temperature than a layer external to it.

Another object is to provide a method of making such microcapsules.

Those skilled in the art will recognize other objects of this invention after they have read the following specification, together with the drawings.

In accordance with the invention, solid particles, which may or may not have ferromagnetic properties and which have a diameter in the range from about a micron to as much as about 500 microns, are encapsulated by a pinhole-free layer of a poly-para-xylylene, known by the generic name of parylene. This layer is formed over the entire surface of each solid particle by molecular deposition of free radicals of parylene monomer that polymerize in place on the surfaces as the particles are tumbled in the presence of a cloud of the monomer. The parylene layer can be deposited using the technique and apparatus shown and described in U.S. Pat. No. 4,508,760, in which I am a joint inventor, and in my U.S. Pat. No. 4,758,288. The initial molecular layer of the polymerized parylene thus produced conforms exactly to the configuration of the surface of each particle as a strong and unbroken electrically insulating barrier to the passage of oxidizing materials or to the electrical current that would be necessary for oxidation, or corrosion, to take place. The pinhole-free parylene is not only an unbroken insulator over the whole core particle but a good primer coat to tie the next encapsulating layer to the parylene-coated core particle.

In accordance with this invention, the next layer can be any thermoplastic or heat-curable resin capable of serving as a binder when the microcapsules are later formed into a shaped structure, e.g., ABS, epoxy, nylon, polyethylene, polypropylene, polysulfone, polyethersulfone, polyetheretherketone, and phenolic resin and others. Polysulfone and polyethersulfone have been found to be particularly satisfactory. Preferably, the binder material should also serve as a lubricant in the process of forming a shaped structure. It is important that the temperature at which the binder material can be shaped into a desired structure be lower than the melting temperature of the parylene used so that the effectiveness of the latter as a barrier layer will not be adversely affected by any heat required in the shaping process.

BRIEF DESCRIPTION OF THE DRAWINGS

FIG. 1 is a cross-sectional, idealized view of a microcapsule according to this invention.

FIG. 2 is a simplified representation of processing apparatus for applying the first layer to the core of the microcapsule in FIG. 1.

FIG. 3 is a simplified representation of fluidized-bed apparatus for forming the outer layer of the microcapsule in FIG. 1.

DETAILED DESCRIPTION OF THE INVENTION

The microcapsule 11 shown in cross section in FIG. 1 includes a solid core particle 12, a first, or inner, layer 13, and a second, or outer, layer 14. The diameter of the core particle 12 may have any value from less than a micron to about 500 microns. While the part is drawn in the idealized form of a perfect sphere, the actual particle is likely to have a very irregular shape with a rough surface, and, in many instances, will be distinctly acicular. The figure given for the diameter is not based on the standard geometrical concept of the diameter as the greatest straight-line distance between any two points on the surface of the particle 12 but is a measure of the size of the holes in a screen through which half of the particles will pass. While the diameter of the particle 12 so measured may be as small as about a micron and as large as about 500 microns, those figures depend on the processing apparatus to be used and the nature of the material of which the particle is formed. A more preferred size range is between 30 microns and 400 microns, and in the case of magnetic particles to receive a second coating in a Wuester coater, as will be described hereinafter, the ideal diameter is in the range of approximately 30–300 microns.

In accordance with this invention, the inner layer 13 is a thermoplastic polymer, the generic name for which is parylene. It is molecularly deposited on the surface of the particle 12 and is characterized by being conformal to the surface and a good electrical insulator, a quality that is enhanced by its being pinhole-free. It is also hydrophobic, tough, and protective of the core particle 12 against mechanical shock, and it does not react chemically with the surface of the particle but is an excellent primer to tie the outer layer 14 to the core particle 12.

Parylene is commercially available as a dimer, and there are, in fact, several parylene dimers, each of which can be polymerized. One forms poly-para-xylylene, which is called parylene N, another forms mono-chloro-poly-para-xylylene (parylene C), and a third forms dichloro-poly-para-xylylene (parylene D).

The second layer 14 can be any of a variety of thermoplastic or heat-curable resins, as previously stated. Its main purpose is to facilitate joining large quantities of microcapsules 11 together into a shaped structure, but the layer 14 also helps protect the core particle 12 from chemical attack and is preferably hydrophobic. In forming a shaped structure, the entire microcapsule 11 is usually heated and subjected to substantial pressure, and it is important that the inner layer 13 retain its integrity under such circumstances. One of the requirements is that the inner layer 13 not melt at a lower temperature than the outer layer 14, and in this respect, also, parylene is particularly well suited, because, in addition to its other features, it has a relatively high melting temperature. The melting temperature of parylene N is listed as 420° C., that for parylene D at 380° C., and that for parylene C at 290° C. By comparison, three of the preferred materials for use as the main component of the layer 14 are polysulfone, referred to as PS, which has a molding temperature of 288° C, nylon 6-6, which has a molding temperature of 254° C., and polyethersulfone, referred to as PES, which has a molding temperature of only 226° C. The fact that parylene N has the highest melting temperature of the three parylenes gives it a clear advantage in this regard and it is the preferred type of parylene to be used with any of the three materials: PS, nylon 6-6, and PES.

The parylene first layer 13 in FIG. 1 can be deposited by the apparatus in FIG. 2. The apparatus includes a refractory tube 16 closed at one end and containing a boat 17 with any of the parylene dimers in it. The dimer in the boat is volatilized in the tube 16 and passes to a pyrolysis furnace 18 that operates at a temperature of about 680° C. A pyrolysis tube 19 follows the furnace and provides a reaction zone for converting the dimer to a monomereric form as a long-lived radical.

The monomer is then transferred to a vacuum deposition zone that includes a housing 21, the interior of which is evacuated to a low pressure on the order of 0.1 torr by a vacuum pump 22. The tube 19 has a necked-down end portion 23, and the vapor monomer is injected into a rotatable drum 24 through the necked-down portion. The drum is partially open at the end that receives the necked-down portion of the pyrolysis tube 19, so that it is in open communication with the vacuum condition of the housing 21.

Disposed within the drum 24 is a supply of the particles 12 of FIG. 1 to be coated by the first layer 13. Also disposed in the drum and rotatable with it is a screen 26 that sifts the particles 12 as they are being tumbled, thereby preventing agglomeration of the particles and tending to maintain their initial particle size distribution.

The drum is rotated on its axis by a motor 27, the shaft of which extends into the housing 21 through a vacuum seal 28. As the particles 12 are tumbled in the drum 24 and sifted through the screen, the monomer, which is present in the vacuum chamber in the form of free radicals, is molecularly deposited on the surfaces of the particles and polymerizes into the barrier layer 13 shown in FIG. 1. By virtue of the molecular deposition, the layer 13 is a conformal coating on each particle, and the thickness of the layer can be less than about 10 microns. Despite the extremely thin nature of the coating, it is evenly distributed and truly conforms to the surface of the particulate base without any significant tendency to agglomerate. The coating is formed on a molecule-by-molecule basis and provides excellent resistance to penetration, either by material migrating outwardly from the particle 12 or inwardly from the second layer 14 or from outside the microcapsule 11.

The layer 14 may be applied by any known technique for encapsulating particles in thermoplastic or heat curable resins, but a preferred way is to use fluidized-bed coating apparatus, such as that shown schematically in FIG. 3. The particles to be coated by this apparatus are identified by reference numeral 29 for convenience, and they consist of core particles like the particle 12 in FIG. 1 with only the first layer 13 on them. The fluidized-bed coating apparatus includes a coating chamber 30 that has a foraminated distributor plate 31 on which a supply of the particles 29 is supported. The holes in the distributor plate are small enough to prevent the particles from falling through freely, although they may be larger than the smallest of the particles. Air is pumped through a duct 32 by a pump 33 to the part of the chamber 30 under the distributor plate 31 and is distributed throughout the upper part of the chamber by the holes in the plate. This flow of air lifts the particles 29 and holds them suspended as a cloud in the space above the distributor plate.

A liquid 34, which is a solution or suspension that includes the material out of which the layer 14 is to be formed and a liquid carrier therefor, is contained in a vessel 35 connected by a pipe 36 to a pump 37. The pump is connected by another pipe 38 to a nozzle 39, which, in the coating chamber 30, is at the center of the distributor plate 31. The configuration of the nozzle is such that it directs a conical spray of droplets of the liquid 34 containing the coating material 14 up into the suspended particles 29. The conical angle of the spray directs the droplets at the entire under side of the cloud of particles, and since the particles are also tumbling freely in space under the influence of the air through the distributor plate 31, all parts of all surfaces of all of the particles 29 receive the droplets. It is not important that the nozzle 39 spray upward into the cloud of particles 29; in other types of fluidized-bed apparatus, a nozzle that serves the same purpose as the nozzle 39 is above the particles and directs a spray downward. What is important in applying liquid material 34 is that the droplets still be in liquid form when they reach the particles 29 so that they will spread out over the surfaces of the particles before the droplets solidify.

The spraying of the droplets of the liquid 34 can be done at room temperature, although it may be desirable either to raise or to lower the temperature of the liquid or the coating chamber 30 as required by the viscosity of the liquid or other characteristics of the particles 29 or the material carried by it to form the layer 14. For example, I have found that, if the liquid 34 includes a carrier consisting of 95% methylene chloride and 5% 1,1,1-trichloroethylene in which is dissolved 10% by weight of polyethersulfone, a satisfactory layer 14 of the polyethersulfone can be formed on iron particles (Hoeganaes Corporation's No. 1000C) that were previously coated with parylene N and have diameters in the range of about 200–300 microns. The liquid 34, so constituted, was sprayed on the parylene-coated particles in a Wuester coater at room temperature for an hour at the rate of 10 ml/min. to form the layer 14.

After the layer 14 is fully formed on the particles 29 in the coating chamber, the particles, which are now complete microcapsules 11 as shown in FIG. 1, may either be used as they are in the formation of shaped structures or they may be packaged in barrels or other containers. If they have been at an elevated temperature in the coating chamber, the resinous surface of the microcapsules may be slightly tacky, causing the microcapsules to agglomerate to some extent. This would be undesirable, even if the tackiness lasted only a short time, but it is particularly so for packaged quantities of such microcapsules. The generally fluffy nature of the mass of microcapsules is not at all conducive to the flow of heat, and the microcapsules, especially those toward the central part of the container, may remain undesirably warm and tacky for a long time. As a consequence, it may be desirable to blow cool or chilled air into the chamber 30 for a short time after a proper amount of the liquid 34 has been sprayed on the particles 29.

Whether or not the microcapsules 11 are placed in a container for storage for an indeterminate time, they will normally go to some type of shaping apparatus sooner or later. In most instances, such apparatus will be a mold, frequently an injection mold, in which the microcapsules will be heated enough to allow the material in the layer 14 to flow in response to the molding pressure. It is desirable that the material in the layer 14 act as a lubricant to facilitate the molding operation, including removing finished parts from the mold. I have found that the force required to push a cylindrical core, which was molded out of microcapsules made according to this invention and had a diameter of $5/16$ in. and a length of $\frac{1}{2}$ in., out of a mold was reduced to 200 lbs. This is in contrast to the force of 4000 lbs. required to push out of the mold a prior art core that had the same dimensions but lacked the parylene inner layer.

The final thickness of the layers 13 and 14 depends on the purpose for which the microcapsule 11 was made and on the specific materials used, but the volume of the layer 13 is typically about 1% to 8% of the volume of the total microcapsule 11, and the volume of material in the layer 14 is typically between about 10% and 24% of the total volume of the microcapsule 11. These values make it possible for the core particle material 12 of such microcapsules to constitute 75% to as much as 80% of the total mass of a product molded from those microcapsules. This percentage is sometimes referred to as the loading factor. In contrast to the high loading factor of as much as 80% achieved by the microcapsules of this invention, if the same product were molded out of microcapsules using the same core particles but made according to the prior art matrix encapsulation, the loading factor would be only about 60%. In the case of ferromagnetic products, in particular, the difference between 60% and 80%, or even 75%, can easily be the difference between a satisfactory product and one that is not. For one thing, the high loading factor achieved through this invention means that permanent magnets may be made that have high B×H products but are no longer excessively fragile. In the case of cores for coils that are to operate on alternating or varying currents or are in motors or generators they may be molded to shapes that were not attainable heretofore. The inherent insulation of these reservoir microcapsules and the rounded corners that may be formed in the molded products as they are made may make separate layers of insulating materials unnecessary, as well as making it unnecessary to take the manufacturing time to put them in place.

While this invention has been described in specific terms, it will be understood by those skilled in the art that the invention is broader than those terms.

What is claimed is:

1. A moldable microcapsule comprising:
   (a) a solid core;
   (b) a conformal, insulating inner layer of parylene encapsulating the core and being free of pinholes; and
   (c) an outer layer encapsulating the inner layer and the core, the outer layer comprising a moldable material that has a melting temperature less than that of the inner layer and is tied to the particle by the inner layer, the inner layer having a volume not substantially greater than 8% of the total volume of the microcapsule, and the outer layer having a volume not substantially greater than 24% of the total volume of the microcapsule, and the combined volume of both layers being not substantially greater than 25% of the total volume of the microcapsule.

2. The moldable microcapsule of claim 1 in which the parylene is poly-para-xylylene.

3. The moldable microcapsule of claim 1 in which the parylene is monochloro-para-xylylene.

4. The moldable microcapusle of claim 1 in which the parylene is dichloro-para-xylylene.

5. The moldable microcapusle of claim 1 in which the volume of the inner layer is at least 1% of the volume of the microcapsule.

6. The moldable microcapusle of claim 1 in which the outer layer is a member of the group consisting of polyethersulfone, polysulfone, and nylon.

7. The moldable microcapsule of claim 6 in which the outer layer is polyethersulfone.

8. The moldable microcapsule of claim 1 in which the volume of the outer layer is at least approximately 10% of the volume of the microcapsule.

9. The moldable microcapsule of claim 1 in which the core is a particle of oxidizable material.

10. The moldable microcapsule of claim 1 in which the core is a particle of ferromagnetic material.

11. The moldable microcapsule of claim 10 in which the core particle is a particle of rare-earth material having a high B×H product.

12. The moldable microcapsule of claim 1 in which the diameter of the core particle, as measured by the diameter of a hole through which 50% of a quantity of such particles could pass is between about one micron and about 500 microns.

13. The moldable microcapsule of claim 12 in which the diameter of the core particle is in the range of about 30-300 microns.

14. A pressure-molded product formed of microcapsules, each of which comprises:
   (a) a solid core particle;
   (b) an inner, conformal pinhole-free insulating layer of parylene; and
   (c) an outer layer of moldable binder material, the layer of parylene forming a primer coat to tie the layer of moldable binder material to the parylene-coated particle and having a melting temperature higher than the molding temperature at which the pressure-molded product is formed, the parylene inner layer of each microcapsule having a volume not substantially greater than 8% of the total volume of that microcapsule, and the outer layer of each capsule having a volume not substantially greater than 24% of the total volume of that microcapsule, at least 75% of the mass of the pressure-molded product consisting of the solid core particles of the microcapsules.

15. The molded product of claim 14 in which at least 80% of the mass of the molded product consists of the solid core particles of the microcapsules.

16. A method of molding a shaped structure of moldable microcapsules, said structure having a high percentage of magnetic material, said method comprising the steps of:
   (a) pyrolyzing a quantity of parylene dimer to form monomeric free radicals thereof;
   (b) molecularly depositing the free radicals on the surface of each particle of a quantity of solid particles of magnetic material while tubling the particles in a low pressure chamber to form a protective polymer inner layer of the monomeric free radicals on all surfaces of each of the particles, separately;
   (c) forming an outer layer of moldable plastic binder material in engagement with the inner layer, said plastic binder material having a shaping temperature lower than the melting temperature of the parylene, the parylene inner layer of each microcapsule having a volume not substantially greater than 8% of the total volume of that microcapsule, and the outer layer of each capsule having a volume not substantially greater than 24% of the total volume of the microcapsule, the combined volume of the inner and outer layers of each microcapsule being not substantially greater than 25% of the total volume of that microcapsule; and
   (d) subjecting a mass of the binder-coated particles to heat above the melting temperature of the binder material and, simultaneously, to pressure sufficient to form the mass into a monolithic body capable of retaining its configuration after being cooled.

17. The method of claim 16 comprising the step of molecularly depositing the free radicals on the surface of the particles to a substantially equal depth for all of the particles.

18. The method of claim 17 in which the step of molecularly depositing the free radicals consists of depositing the free radicals to a depth such that the volume of the inner layer of parylene is not substantially greater than 10% of the volume of the microcapsule.

19. The method of claim 18 further comprising the steps of:

(a) simultaneously air-supporting and tumbling the coated particles;
(b) spraying droplets of liquid comprising the thermoplastic material and a liquid carrier therefor on the air-supported particles and allowing the liquid to spread over the surface of each of the particles; and
(c) continuing to air-support the particles until the liquid dries to form, on the conformally coated particles, a layer of the thermoplastic material having a volume between about 10% and 24% of the volume of the microcapsules.

* * * * *